F. MATHEWS.
SUPPORTING BRACKET FOR CAR DOORS.
APPLICATION FILED FEB. 19, 1915.
1,148,607.  
Patented Aug. 3, 1915.
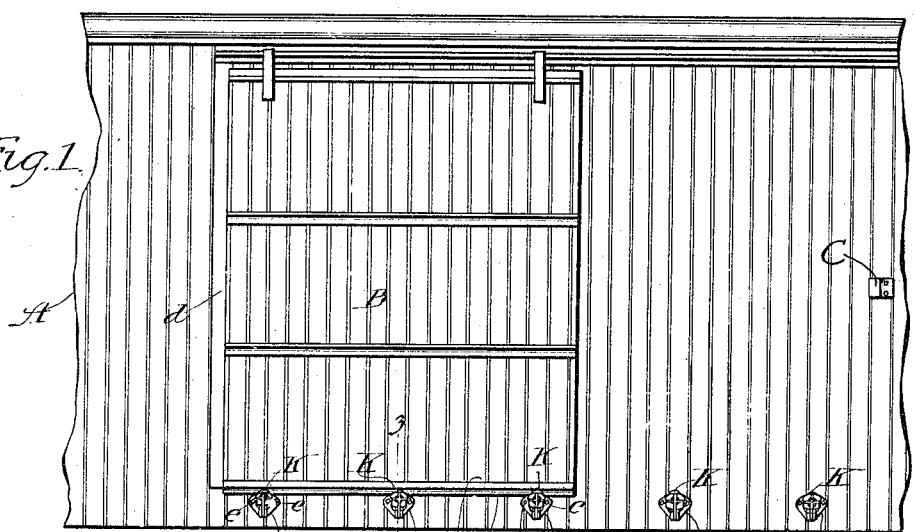
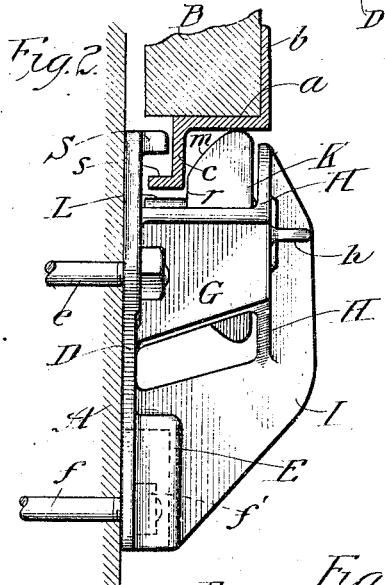
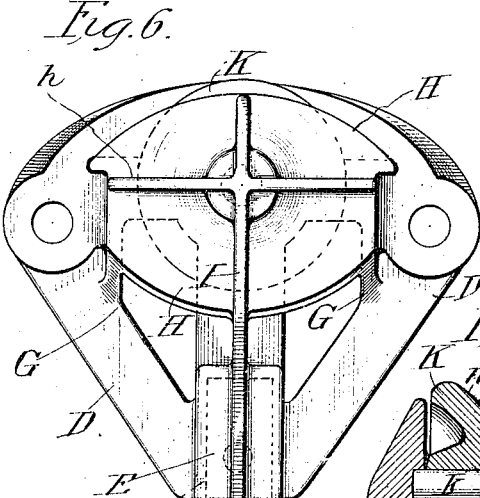
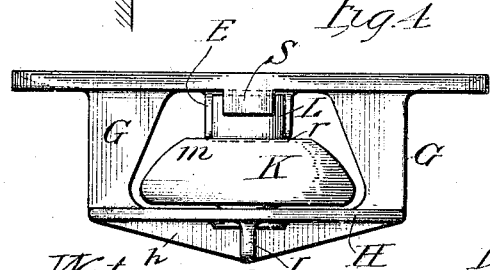
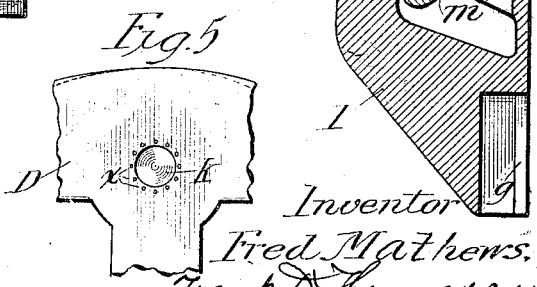
Witnesses.  
Inventor  
Fred Mathews.

UNITED STATES PATENT OFFICE.

FRED MATHEWS, OF CHICAGO, ILLINOIS, ASSIGNOR TO CLINTON C. MURPHY, OF CHICAGO, ILLINOIS.

SUPPORTING-BRACKET FOR CAR-DOORS.

1,148,607.

Specification of Letters Patent. Patented Aug. 3, 1915.

Application filed February 19, 1915. Serial No. 9,352.

*To all whom it may concern:*

Be it known that I, FRED MATHEWS, a citizen of the United States, and resident of Chicago, in the county of Cook and State of Illinois, have invented new and useful Improvements in Supporting-Brackets for Car-Doors, of which the following is a full, clear, and exact description.

My invention relates to improvements in car doors, and particularly to the construction of the supporting brackets for freight car doors.

My improvements are particularly adapted for use in connection with car-doors the lower edges of which are shod with Z-bars, and the objects are to prevent the door from being lifted or pried off of its seat; to hold the door closely against the side of the car particularly as it approaches the limit of its closing movement; to so construct the anti-friction wheels supporting the door that the circumferential surface of the same engaging said door will be reduced to a minimum and will work equally when the tread of the Z-bar is tilted to one side as when perfectly horizontal, and to so construct the spindles of said wheels that the cost of assembling the parts of the bracket is greatly reduced, and the voluntary or involuntary removal of the spindles of said wheels when the bracket is mounted in place is rendered impossible. This I accomplish by the means hereinafter fully described, and as particularly pointed out in the claims.

In the drawings: Figure 1 is a side elevation of a fragment of a car and the door thereof supported by my improved brackets. Fig. 2 is a side or edge view of one of said brackets and a fragment of the side of the car to which it is attached. Fig. 3 is a vertical transverse section taken on dotted line 3—3, Fig. 1. Fig. 4 is a plan view of said bracket. Fig. 5 is a rear view of a fragment of the attaching-plate in which the bearing of the rotatable spindle is made. Fig. 6 is a front elevation of the bracket removed from its support.

Referring to the drawings, A represents the side of a freight car having the usual door-way therein, and B a longitudinally slidable door for closing the same. In so far as my invention is concerned it is immaterial how the car or the door-way thereof are constructed, and it is also immaterial how the door itself is constructed, excepting that I prefer to have its lower edge shod with a Z-bar runner extending from end to end thereof, and to support the weight of the door, principally, if not wholly, by brackets of the type to which my improved bracket belongs. The horizontal web $a$ of this Z-bar constitutes a tread or runner which is secured flat against the lower edge of the door; the outer upwardly extending flange $b$ thereof laps against the outer lower margin of said door, and the inner flange $c$ of the same extends downward below said edge in a vertical plane near and parallel to the inner surface of the door. The door is supported by and slides back and forth upon my improved brackets, which are so placed that one will be under each end of the door-way, one midway between the same, and two in the same horizontal plane against the side of the car in equi-distant relation to the others. As shown in the drawings, the left-hand jamb of the door-way consists of a vertical strip $d$ against which the advancing edge of the door impinges when it is closed. A suitable stop C attached to the side of the car limits its rearward movement.

The supporting brackets comprise a substantially flat attaching-plate D, the contours described by the edges of which are substantially triangular. This plate is secured in position by bolts $e$, $e$, that pass through bolt openings in the lobes at the ends of the upper horizontally disposed edge of the same, and by a bolt $f$ the screw-threaded outer end of which extends through a vertically elongated slot $g$ extending upward from the lower truncated angle of said plate a suitable distance. The outer end of bolt $f$ is screwed into a nut $f'$ placed within the bore of a vertically elongated box E, which latter is cast in one piece with and projects from the plate in front of said slot. The width of the bore of this box is greater than that of slot $g$, and nut $f'$ cannot turn when placed within the same, and when bolt $f$ is screwed home to clamp the lower part of the plate against the side of the car.

The screw-plate is, preferably, lightened by removing portions of the web thereof on either side of the vertically disposed central portion extending up above the box, and on either side of these openings the screw-plate has corresponding parallel side-walls G, G, of a bracket projecting outwardly therefrom, the outer vertical edges of which are connected by a face-plate H. These side-walls G and face-plate H project out in front of the upper central portion of the attaching-plate D and form a rectangular inclosure within the confines of which the revoluble members of my improvements are journaled, substantially as hereinafter more fully explained.

Midway between side-walls G the face-plate H is further supported and braced by a vertically disposed metallic strut I the web of which is disposed in a vertical plane at right angles to the attaching-plate, and springs from and is made integral with the shell of said box, and the portion of the attaching-plate just above the same, and it extends vertically forward and upward from its lower end and extends vertically in front of and projects like a rib from said face-plate. The upper edge of the face-plate is, preferably, curved upward, and it is provided with a horizontal rib $h$ that extends from one side to the other side thereof.

Immediately back of the point of intersection of the upper portion of the strut and rib $h$ the face-plate is provided with a boss which has a blind bearing $n$ in the inner side thereof. The forward end of a horizontal spindle $k$ is journaled in this blind bearing, and the rear end thereof is journaled in a suitable bearing $o$ in the center of width of the attaching-plate D adjacent the upper edge thereof. The bearing $o$ extends through plate D and the rear end of the spindle terminates and is confined in said bearing by punching the rear marginal surface $x$ of the attaching-plate surrounding bearing $o$ and slightly reducing the diameter of the rear end of the same. When the attaching-plate is secured to the car the side-wall of the car itself provides a further means of preventing the displacement of the spindle from its bearings. Immediately in rear of its forward bearing, spindle $k$ has a wheel K mounted thereon the diameter of which is such that it extends above the upper edge of the face-plate, and between this wheel K and its rear bearing spindle $k$ has a sleeve L mounted thereon, which may be loose, as shown in Fig. 3 of the drawings, or made in one piece and revoluble with said wheel, as shown in Fig. 4. The circumference of wheel K is round or convex in cross-section and the horizontal web or tread $a$ of the Z-bar rests and travels upon this rounded circumference, and if the tread was not perfectly horizontal, but tilted to one side it would ride just as easy on the wheel.

The horizontally disposed tread of the Z-bar binding the lower edge of said door rests and travels on wheel K, and the lower edge of the depending flange $c$ thereof rides on sleeve L. When the lower edge of flange $c$ rests on this sleeve the necessity for the independent revolution of the wheel and the sleeve as separate entities is apparent, as the sleeve would revolve more rapidly when the door is slid longitudinally back and forth a given distance than the wheel whose circumference is greater, but when flange $c$ does not rest on sleeve L it can be made integral therewith.

In order to move the lower edge of the door closer against the side of the car, particularly when it is reaching the limit of its closed position, I prefer to belly or make the inner surface of the wheel K of the bracket nearest jamb strip $d$ convexed, substantially as shown in the drawings. Thus when the advancing edge of the door is approaching the limit of its closing movement, the adjacent end of the depending flange of the Z-bar will strike the convexed face of the wheel, and as it moves forward the sleeve will be wedged inward by the convexed surface $m$ and push the door tightly against the side of the car. In order, however, to prevent the lower flange of the Z-bar from riding up the convexed side of the wheel, I flatten or truncate the central portion or zone of the convexed side of the wheel next the spindle. The pressure of this flattened central portion $r$ removes the inclined or convexed surface up which it would be possible for the lower edge of the flange $c$ to creep and thus eliminate this danger.

In order to prevent the door from being lifted off wheel K far enough to make it possible to dismount the door from the bracket, I bend the lower edge $s$ of flange $c$ of the Z-bar laterally toward the attaching-plate, preferably, its entire length, and I provide the attaching-plate above spindle $k$ with an outward projecting retaining lug S, which overhangs edge $s$ of flange $c$ and prevents the raising of the door more than, say, three eighths of an inch. This construction effectually answers the purpose for which it is intended, as the lug is adapted to engage the edge $s$ at any point throughout the length of the door. It is, of course, only possible to employ lug S in connection with a Z-bar whose lower flange is constructed as described or with some equivalent projecting edge or tenon secured to and projecting rearward from the lower edge of the car-door.

What I claim as new is:

1. A support for car doors comprising an attaching-plate, a bracket including a face-plate in front of and separated from said attaching-plate having a blind bearing in its rear surface, a spindle the front end of which is journaled in said blind bearing and the rear end of which is journaled and terminates in a bearing in said attaching-plate, and revoluble anti-friction devices mounted on said spindle.

2. A support for car doors comprising an attaching-plate, a bracket including a face-plate in front of and separated from said attaching-plate having a blind bearing in its rear surface, a spindle the front end of which is journaled in said blind bearing and the rear end of which is journaled and terminates in a bearing in said attaching-plate, a wheel made fast to said spindle, and a sleeve mounted on the spindle between the wheel and the attaching-plate.

3. A longitudinally slidable element and a rolled metal runner secured to the lower edge thereof having a downwardly projecting flange, in combination with a support for the same comprising an attaching-plate, a bracket including a face-plate in front of and separated from said attaching-plate having a blind bearing in its rear surface, a spindle the front end of which is journaled in said blind bearing and the rear end of which is journaled in a bearing in said attaching-plate, and a wheel securely mounted on said spindle adjacent said blind bearing and having its rear face bellied or convexed.

4. A longitudinally slidable element and a rolled metal runner secured to the lower edge thereof and having a downwardly projecting flange, in combination with a support for the same comprising an attaching-plate, a bracket including a face-plate in front of and separated from the attaching-plate having a blind bearing in its rear surface, a spindle the front end of which is journaled in said blind bearing and the rear end of which is journaled and terminates in a bearing in said attaching-plate, the rear end of said last mentioned bearing being reduced in diameter, and revoluble anti-friction devices mounted on said spindle.

5. A longitudinally slidable element and a rolled metal runner secured to the lower edge thereof and having a downwardly projecting flange, in combination with a support for the same comprising an attaching-plate, a bracket including a face-plate in front of and separated from said attaching-plate having a blind bearing in its rear surface, a spindle the front end of which is journaled in said blind bearing and terminates in said attaching-plate the diameter of the rear end of which is reduced to prevent longitudinal movement of said spindle, a wheel securely mounted on said spindle, and a sleeve of less diameter loosely mounted on the latter between said wheel and said attaching-plate.

6. A longitudinally slidable element and a rolled metal runner secured to the lower edge thereof and having a downwardly projecting flange, in combination with a support for the same comprising an attaching-plate, a bracket including a face-plate in front of and separated from said attaching-plate having a blind bearing in its rear surface, a spindle the front end of which is journaled in said blind bearing and the rear end of which is journaled and terminates in a bearing in said attaching-plate the diameter of the rear end of which is reduced to prevent longitudinal movement of said spindle, a wheel securely mounted on said spindle and having its rear face bellied or convexed.

7. The combination with a bracket having an attaching-plate the upper portion of which has a retaining lug projecting forward therefrom, a bracket including a face-plate in front of and separated from said attaching-plate in combination with a superposed sliding element, a metallic tread for said lower edge having a downwardly projecting longitudinal flange whose lower edge is bent laterally toward said attaching-plate under said lug.

8. The combination with a bracket having an attaching-plate the upper portion of which has a retaining lug projecting forward therefrom, a bracket including a face-plate in front of and separated from said attaching-plate, a spindle journaled in said face-plate and attaching-plate, and a wheel mounted on said spindle and having the inner side thereof convex, in combination with a superposed sliding element, and a metallic tread for the lower edge thereof having a downwardly projecting flange extending the full length of said tread whose lower edge is bent toward and under said retaining lug.

9. The combination with a bracket having an attaching-plate the upper portion of which has a retaining lug projecting forward therefrom, a bracket including a face-plate in front of and separated from said attaching-plate, a spindle journaled in said face-plate and attaching-plate, and a wheel mounted on said spindle and having the inner side thereof convex and having the central portion of said side flat, in combination with a superposed sliding element, and a metallic tread for the lower edge thereof having a downwardly projecting flange extending the full length of said tread whose lower edge is bent toward and under said retaining lug.

In witness whereof I have hereunto set my hand this 15th day of February, 1915.

FRED MATHEWS.

Witnesses:
FRANK D. THOMASON,
FLORENCE MITCHELL.